United States Patent [19]

Pieri et al.

[11] 4,031,096
[45] June 21, 1977

[54] FLUORESCENT AZABENZANTHRONIC DYES

[75] Inventors: Giampiero Pieri, Saronno (Varese); Filippo Maria Carlini, Novara; Camillo Paffoni, Pogno (Novara); Gioacchino Boffa, Novara, all of Italy

[73] Assignee: Montedison S.p.A., Milan, Italy

[22] Filed: Apr. 21, 1976

[21] Appl. No.: 679,030

[30] Foreign Application Priority Data
Apr. 24, 1975 Italy .................................. 22723/75

[52] U.S. Cl. .................................. 260/272; 208/12; 260/42.21

[51] Int. Cl.² .......................................... C09B 5/14

[58] Field of Search ............... 260/278, 42.21, 272

[56] References Cited
UNITED STATES PATENTS 3,678,053  7/1972  Boffa et al. ..................... 260/278
3,786,017  1/1974  Genta ............................ 260/42.21

Primary Examiner—Paul M. Coughlan, Jr.
Attorney, Agent, or Firm—Stevens, Davis, Miller & Mosher

[57] ABSTRACT

A fluorescent azabenzanthronic dye is disclosed having the general formula (I):

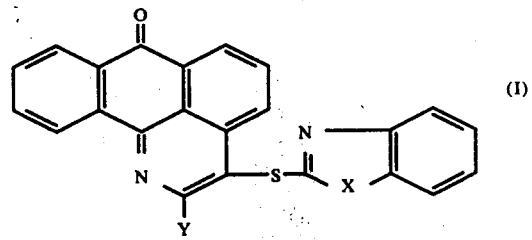

wherein $X = -NH-$ or $-S-$; and $Y = -OCH_3$ or $-OC_2H_5$. A process for the preparation of a dye of the general formula (I) is also disclosed. These dyes are useful in the bulk dyeing of polystyrene, polymethylmethacrylate, rigid PVC, polyethylene, acrylonitrile/butadiene/styrene copolymers, polycarbonates or mineral oils.

3 Claims, No Drawings

FLUORESCENT AZABENZANTHRONIC DYES

The present invention relates to a new class of organic dyes derived from 1-azabenzanthrone, and having the general formula (I):

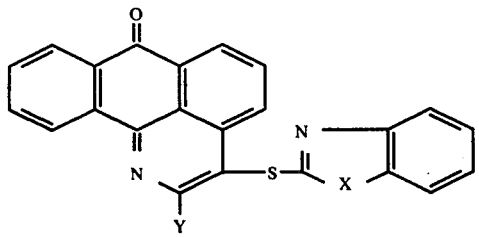

wherein
X = —NH— or —S—; and
Y = —OCH$_3$ or —OC$_2$H$_5$.

More particularly, the present invention relates to the synthesis of novel pklastosoluble fluorescent dyes of structue (I), obtained by reacting at 80° to bout 140° C, for about 4 to 8 hours, azabenzanthronic halogenderivatives of structure (II), dissolved in dipolar aprotic solvents, with heterocyclic mercaptoderivatives (III), in the presence of suitable acidity acceptors, according to the following reaction scheme:

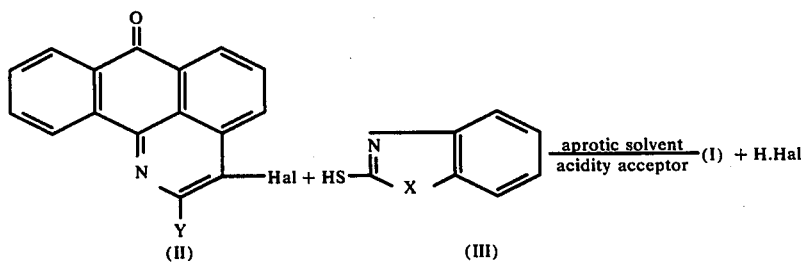

wherein X and Y have the meanings already specified; and

Hal = Br or Cl.

This new class of compounds, having structure (I), forms a group of dyes for the bulk-dyeing of polystyrene, polymethylmethacrylate, rigid polyvinylchloride (PVC), polyethyene, ABS copolymers (acrylonitrile-butadiene-styrene), polycarbonates and the like, as well as for the coloring of mineral oils. For the sake of brevity they are referred to herein as "plastosoluble" dyes, by whick is meant they are readily soluble, miscible or dispersible in the plastic materials or mineral oils with which they are to be associated as fluorescent dyes.

The intermediates of structure (II), which per se are known, and which are used for the preparation of the dyes of this invention, are essentially the 3-bromo-2-methoxy-1-azabenzanthrone and the 3-bromo-2-ethoxy-1-azabenzanthrone obtanable through the technique already described in Italian Pat. No. 869,691. Thus to a solution of 1-aza-2-hydroxybenzanthrone in concentrated sulphuric acid, bromine is added in slight excess at room temperature. Thereupon the solution is heated at 40°-50° C for a few hours, after which the reaction mass is poured into water and ice. The resulting mass is then washed until neutrality is reached. The bromo-derivative is then treated at a temperature between 0° and 50° C with dimethyl (or diethyl) sulphate, in the presence of dilute alkali. The alkoxy-bromoderivative (II) is then filtered and dried.

Intermediates of structure (III) used and already known per se are: 2-mercaptobenzimidazole and 2-mercaptobenzothiazole.

The dipolar aprotic solvents that may conveniently be used for the preparation of dyes of structure (I) are dmethylformamide, dimethylacetamide, dimethylsulphoxide, 1-methyl-pyrrolidone, hexamethylphosphotriamide, separately or in admixture with each other.

As acidity acceptors there may be used: anhydrous sodium carbonate, anhydrous potassium carbonate and organic bases, such as pyridine and piperidine, also separately or in admixture with each other.

The reaction temperatures may range from about 80° to about 140° C. The reaction times range from 4 to 8 hours.

The compounds according to formula (I) are particularly interesting because, thanks to the presence of the alkoxyl group, they allow one to achieve very intense yellow-gold or yellow-orange tones. One peculiarity of such compounds is that of showing a high molecular extinction coefficient ($\epsilon$), which leads to a high dyeing power.

The color tones obtainable are extremely glossy, and the stabilities obtained, and in particular light fastness and resistance to thermal treatment, are excellent.

The particular high gloss imparted to the above listed materials by the dyes of this invention is to be traced back to the considerable fluorescence that these compounds develop when dissolved in the plastic materials or in the mineral oil that serves as solvent.

When those dyes are incorporated into the substrate in the absence of dulling agents, such as e.g. TiO$_2$, there are obtained perfectly transparent manufactured articles. In the presence of TiO$_2$ there are achieved full and pure tones, which again range from yellow to orange.

The application to or with plastic materials of the dyes of this inventin is carried out by directly mixing, according to per se known methods, the dye and the plastic or resin powder or granules, in the presence or absence of dulling agents, depending on the degree of transparency desired.

The mixture thus obtained is subjected to a homogenizing treatment either by calandering or by passing same through an extruder, at temperatures best suited for each type of polymer or resin in the molten state. For instance, in the case of polystyrene, the homogenization is carried out in the extruder at between 190° and 220° C. Subsequently the material coming from the extruder is converted into granules in a suitable cutter and is then subjected to the desired molding operations, for instance in a conventional injection-molding press.

The following examples will still further illustrate the preparation, characteristics and applicative methods of some of the dyes of the general formula (I), without intending thereby in any way to limit the wider scope of the invention itself.

EXAMPLE 1

6.8 grams of 2-methoxy-3-bromo-1-azabenzanthrone, 4.65 g of 2-mercaptobenzimidazole, 3.15 g of anhydrous sodium carbonate, and 50 ml of dimethylformamide were refluxed for 2 hours. The mixture was then left to cool down to room temperature, filtered, washed with dimethylformamide and then with hot water. Finally it was dried at 100° C.

In this way 4.05 g of a raw product were obtained which, after crystallization from alpha-chloronaphthalene, yielded 3.8 g of a purified product in the form of a yellow-orange powder. The thus-purified product melted at 360° C accompanied by decomposition.

The elemental analysis by weight confirmed the structure:

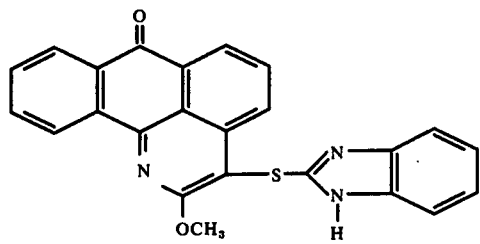

| Theoret. % | Actual % |
|---|---|
| C = 70.4 | 70.8 |
| H = 3.7 | 3.9 |
| N = 10.3 | 10.1 |
| O = 7.8 | — |
| S = 7.8 | 7.6 |

EXAMPLE 2

Similarly, for $X = -S-$ and $Y = -OCH_3$ in the starting intermediates (III) and (II) respectively, and operating under the same conditions as those of Example 1, there was obtained the compound whose chromatic properties are summarized in the following table together with those of the compound of Example 1.

TABLE 1

| Ex. | X | Y | λmax. (DMF) | Tone | Fluorescence |
|---|---|---|---|---|---|
| 1 | —NH— | —OCH$_3$ | 510 mμ | yellow-orange | deep yellow |
| 2 | —S— | —OCH$_3$ | 450 mμ | yellow-gold | yellow | wherein λmax. = wave length (in mμ) of maximum absorption in the spectrum of the visible (determined through spectrophotometry); and DMF = dimethylformamide

EXAMPLE 3

This example shows the application of the dye of Example 1 to polymethylmethacrylate.

0.04 g of the dye, previously dispersed and homogenized with 100 g of polymethylmethacrylate in a rotating drum running for 48 hours, were conditioned over night at 110° C.

The resin plus dye, loaded into the hopper of the extruder, was then extruded at a temperature between 190° and 220° C. The material coming from the extruder, after granulation, was carefully dried and subsequently injection-molded at a temperature between 220° and 230° C.

The manufactured article thus obtained was then subjected to the fastness tests according to UNI Standards (Ente Nazionale Italiano Unificazione), corresonding to USA A.A.T.C.C. Standards.

The stabilities, particularly light fastness, proved in all cases to range from good to excellent.

The granulated material, when subjected to heat stability tests by extrusion with 1 minute cycles at temperatures between 220° and 300° C, in general showed an excellent thermal stability.

What is claimed is:

1. A fluorescent azabenzanthronic dye having the general formula (I):

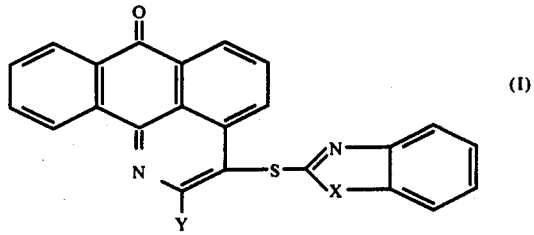

wherein X = —NH— or —S—; and Y = —OCH$_3$ or —OC$_2$H$_5$.

2. The dye of claim 1, wherein X = —NH— and Y = —OCH$_3$.

3. The dye of claim 1, wherein X = —S— and Y = —OCH$_3$.

* * * * *